INVENTORS
CLARENCE J. SCHILLING
LILBURN CARROLL CLAITOR
BY Shanley & O'Neil
ATTORNEYS

United States Patent Office 3,086,371
Patented Apr. 23, 1963

3,086,371
FRACTIONATION OF GASEOUS MIXTURES
Clarence J. Schilling and Lilburn Carroll Claitor, Allentown, Pa., assignors, by mesne assignments, to Air Products and Chemicals, Inc., Trexlertown, Pa., a corporation of Delaware
Filed Sept. 12, 1957, Ser. No. 683,643
31 Claims. (Cl. 62—13)

This invention relates to improvements in the separation of gaseous mixtures and more particularly to the separation of gaseous mixtures by liquefaction and fractionation.

In the separation of gaseous mixtures into component gas in a fractionating operation, compressed gaseous mixture is cooled by heat interchange with relatively cold components of the gaseous mixture and is fed to a single or multiple stage fractionating zone wherein the gaseous mixture is separated producing component gas. For example, in the fractionation of atmospheric air, high boiling point component, essentially oxygen, and low boiling point component, essentially nitrogen, are produced as component gas. Although the present invention is disclosed and described in the environment of the separation of atmospheric air, it is to be expressly understood that the principles of the present invention may be employed in connection with the separation of other gaseous mixtures by a fractionating operation. Also, it is to be expressly understood that the term "component gas" employed in the following description jointly and severally defines the different boiling point fractions of a gaseous mixture, such as the oxygen and nitrogen fractions of air.

Two different types of cycles have been proposed in the past for providing component gas in gaseous phase under high pressure and at ambient temperature. In one type of cycle, which may be referred to as a "gas cycle," component gas is withdrawn from the fractionating zone in gaseous phase, warmed to ambient temperature upon passing in heat exchange effecting relation with gaseous mixture on its way to the fractionating zone and is then compressed to the relatively high pressure desired by means of a centrifugal type compressor. In another type of cycle, identified herein as a "pump cycle," component gas is withdrawn from the fractionating zone in liquid phase, pumped while in liquid phase to the desired relatively high pressure, and then passed in heat exchange effecting relation with the gaseous mixture on its way to the fractionating zone to vaporize and to warm the high pressure component gas to ambient temperature. Each of these cycles possesses advantages and disadvantages not presented by the other.

In particular, considering the separation of atmospheric air into oxygen and nitrogen component where oxygen is required in gaseous phase under relatively high pressure, the power requirements of a "gas cycle" are low since atmospheric air fed to the cycle need only be compressed to a relatively low superatmospheric pressure, such as 85 to 100 p.s.i.a., for example, and it is possible to remove high boiling impurities from the atmospheric air feed, particularly carbon dioxide and moisture, by the use of switching heat exchange zones which eliminates the need for chemical scrubbing and drying equipment. However, this type of cycle can only produce oxygen under relatively high pressure by the use of an oxygen compressor operating at ambient temperature. This requirement increases the power consumption and presents explosion hazards and expensive maintenance problems. Furthermore, in a "gas cycle" it is not possible to apply large quantities of external refrigeration. Moreover, due to the differences at low temperatures in specific heat of atmospheric air under the required pressure and the specific heat of component gas under the relatively low pressure of the fractionating zone, additional means must be provided to "unbalance" the switching heat exchange zones and insure removal of deposited high boiling point impurities, such as carbon dioxide, to permit substantially continuous operation of the cycle. In the "pump cycle" oxygen is delivered in gaseous phase at a desired relatively high pressure and gaseous oxygen pumping equipment is not required, the oxygen being uncontaminated with high boiling point impurity. Also, it is possible to apply large quantities of external refrigeration to a "pump cycle." On the other hand, in the "pump cycle" it is necessary to compress the atmospheric air to a higher pressure in order to obtain efficient heat interchange, and means other than switching heat exchange zones are required for removing high boiling point impurities from the air feed.

Attempts have been made to provide a cycle which obtains the advantages of the "pump cycle" at a power cost which is competitive with a "gas cycle" of corresponding capacity. In one prior cycle a major portion of the air feed compressed to a relatively low superatmospheric pressure, such as 85 to 100 p.s.i.a., is cooled in heat exchange effecting relation with gaseous nitrogen product under low pressure in a reversing heat exchange zone which is unbalanced by controlling the relative mass of the fluids flowing therethrough to obtain substantially complete removal of high boiling point impurities. The minor portion of the air feed is compressed to a higher superatmospheric pressure, treated chemically to remove high boiling point impurity, dried, and then passed through a non-switching heat exchange zone in heat exchange effecting relation with oxygen product under a relatively high pressure obtained by pumping oxygen in liquid phase. The minor portion of the air feed cooled during this heat interchange is expanded to the pressure of the major portion of the air feed and is merged therewith and the total air feed is introduced into a fractionating zone. It is not possible to obtain efficient separation of gaseous mixtures with this type of cycle due to a substantial loss of cold resulting from a wide temperature difference which inherently exists at the warm end of at least one of the heat exchange zones.

In order to effect heat exchange between two fluids at different temperatures, such as air at ambient temperature and cold nitrogen or oxygen component gas from a fractionating zone, the air must be warmer than the cold component gas at each point along the path of the heat exchange zone, and in order to prevent loss of cold the temperature difference between the fluids at the warm end of the heat exchange zone must be small, such as within 5° to 10° F. A close temperature approach at the warm end of a heat exchange zone in which cold nitrogen component gas under low pressure, such as 20 p.s.i.a., is passed in heat exchange effecting relation with warm gaseous air feed at a relatively low superatmospheric pressure, 85 p.s.i.a., for example, may be obtained by passing a relatively greater mass of cold component nitrogen gas through the heat exchange zone. On the other hand, in order to obtain a close temperature approach at the warm end of a heat exchange zone in which cold oxygen component gas under high pressure is passed in heat exchange effecting relation with warm gaseous air feed, it is necessary to pass a greater quantity of air feed through the heat exchange zone even when the air feed is at an optimum pressure at which a minimum quantity of air is required to warm the high pressure oxygen to the required temperature. However, the mass difference between the air under relatively low superatmospheric pressure and the nitrogen component under low pressure is less than the mass difference between the high pressure air and the high pressure oxygen.

Thus, cycles in which component gas is delivered at different pressures inherently present cold loss even when a portion of the feed mixture under an optimum high pressure is passed in heat interchange with the high pressure component.

In a recent attempt to solve this problem, a portion of the feed mixture is compressed to a very high pressure as required for optimum heat interchange with component gas under low pressure and is passed in heat exchange effecting relation with excess low pressure component gas that would exist upon adjusting the relative mass of high pressure feed mixture and high pressure component gas and the relative mass of low pressure feed mixture and component gas under low pressure for minimum loss of cold. This solution to the problem requires the use of an additional heat exchange device and an additional compressor with increased power requirements.

It is an object of the present invention to provide a novel fractionating cycle which comprises a simple solution to the problem of loss of cold in the heat exchange zones upon delivering component gases under different pressures.

Another object is to provide a novel fractionating cycle which obtains the advantages of the "pump cycle" at a power cost which is competitive with a "gas cycle" of corresponding capacity.

Still another object of the present invention is to provide a novel fractionating cycle of the type in which a major portion of the gaseous feed mixture is compressed to a relatively low superatmospheric pressure and passed in heat exchange effecting relation with cold component gas under relatively low pressure and in which the remaining minor portion of the feed mixture is compressed to an optimum relatively higher superatmospheric pressure and passed in heat exchange effecting relation with pumped component gas, so characterized that small temperature differences with resulting minimum cold loss are maintained at the warm ends of the heat exchange zones by a relatively simple arrangement which also improves the over-all efficiency of the cycle.

According to the principles of the present invention, a major portion of the feed mixture, compressed to a low superatmospheric pressure required for operation of the fractionating column, such as 85 to 100 p.s.i.a. in the case of atmospheric air, is passed in heat exchange effecting relation with cold component gas under low pressure and of the proper relative mass to establish a close temperature difference between the fluids at the warm end of the heat interchange. The remaining portion of the feed mixture, the minor portion, compressed to an optimum higher superatmospheric pressure determined by the pressure of the component gas delivered from the cycle under relatively high pressure, is simultaneously passed in heat exchange effecting relation with component gas under relatively high pressure and with component gas under low pressure. The feature provided by the present invention of passing a stream of component gas under a pressure less than the pressure of the high pressure component gas in countercurrent heat exchange effecting relation with the minor portion of the feed mixture under an optimum higher superatmospheric pressure, effectively compensates for the deficiency of feed mixture at the optimum higher superatmospheric pressure that would exist upon establishing the proper mass relationship between the major portion of the feed mixture and the component gas under low pressure and makes it possible to proportion the mass of the feed mixture at the optimum higher superatmospheric pressure relative to the mass of the component gas under high pressure and relative to the mass of the stream of component gas under relatively low pressure and establish a close temperature difference between the fluids at the warm end of the heat interchange. The component gas under low pressure passed in countercurrent heat exchange effecting relation with the minor portion of the feed mixture at optimum higher superatmospheric pressure and the component gas under low pressure passed in heat exchange effecting relation with the major portion of the feed mixture may comprise one or more components of the feed mixture depending in part upon the composition of the feed mixture and the quantity of component gas under relatively high pressure.

The feature provided by the present invention of passing a stream of low pressure component gas in countercurrent heat exchange effecting relation with the minor portion of the feed mixture under high pressure not only makes it possible to obtain heat interchange between the total feed mixture and the available cold component gas with minimum loss of cold but also improves the efficiency of the heat interchange between the pumped component and the minor portion of the feed mixture. This results from the fact that the temperature-enthalpy curves of streams of high pressure component gas and feed mixture under a relatively high optimum pressure of the proper mass relationship to establish a minimum temperature difference at the warm end of the heat exchange zone diverge from each other relatively from a point of minimum temperature difference toward the warm and cold ends of the heat exchange zone. As a consequence, maximum heat exchange efficiency is obtained only in a region of the heat exchange zone. The temperature-enthalpy curve of a stream of low pressure component gas diverges in a manner opposite to the divergence of the temperature-enthalpy curve of the stream of high pressure component gas, and the presence of a stream of component gas under low pressure also in heat exchange effecting relation with the high pressure feed mixture produces a resulting temperature-enthalpy curve for the total component gas which approaches parallel relationship with the temperature-enthalpy curve of the minor portion of the feed mixture. Thus, a more uniform temperature difference is maintained between the high pressure feed mixture and the total component gas throughout the heat exchange zone and more efficient heat interchange and a smaller temperature difference at the ends of the heat exchange zone are obtained.

Moreover, cycles embodying the principles of the present invention may be operated to establish the temperature difference between the major portion of the feed mixture under relatively low superatmospheric pressure and the low pressure component at the cold end of the heat exchange zone so that high boiling point impurities are substantially removed from the major portion of the gaseous feed mixture, such as moisture and carbon dioxide in the case of atmospheric air, by the use of a switching heat exchange device. In such case, high boiling point impurity may be removed from the minor portion of the feed mixture by any suitable means such as by chemical scrubbing and drying or by a freezing process employing filters and adsorbers. In this connection, the feature of the present invention of passing component gas under low pressure through a separate path of the heat exchange zone for high pressure feed mixture and high pressure component gas makes it possible to provide cycles capable of producing uncontaminated component gas under low pressure. For example, in the fractionation of atmospheric air according to the present invention uncontaminated nitrogen and/or oxygen under low pressure may be obtained in addition to uncontaminated component gas under high pressure.

In a fractionating cycle embodying the principles of the present invention refrigeration required to maintain operation of the cycle may be easily obtained in quantities greater than what would ordinarily be expected without effecting adversely the desired operation of the cycle. In addition to the expansion through a valve of the high pressure minor portion of the feed mixture to the pressure of the fractionating zone, refrigeration may be obtained by expanding with work fluid streams under high pressure warmed by heat interchange with the cold end of the high pressure feed mixture-high pressure component gas heat exchange zone. Also, refrigeration may be obtained by removing heat from the high pressure feed mixture by means of a source of external refrigeration. For example, the high pressure feed mixture may be withdrawn from its path through the heat exchange zone at the proper temperature level for heat interchange with a boiling liquid refrigerant and then returned to the heat exchange zone at a lower temperature. In accordance with the present invention the mass of the minor portion of the feed mixture under high pressure may be established throughout a wide range in accordance with variants introduced when additional refrigeration is required to warm to a desired temperature the high pressure component gas and the low pressure component gas in heat interchange therewith and to maintain the proper mass relationship between the major portion of the feed mixture and the low pressure component gas.

The foregoing and other objects and features of the present invention will appear more fully from the following detailed description considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views.

Figure 1:
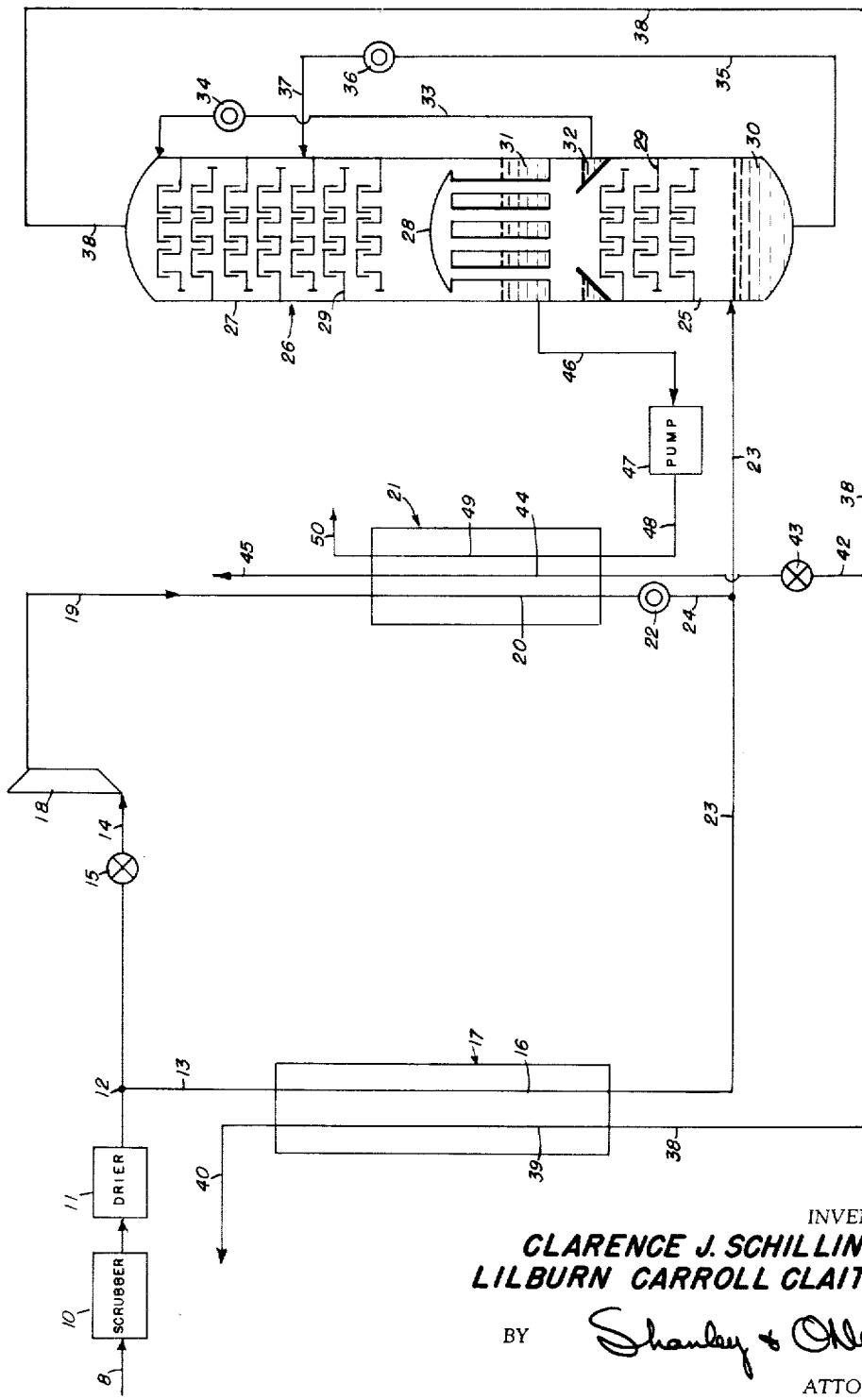
FIGURE 1 is a diagrammatic presentation of a fractionating cycle constructed in accordance with the principles of the present invention.

With reference more particularly to FIGURE 1 of the drawings, a fractionating cycle for separating gaseous mixtures into its components is shown therein embodying the principles of the present invention. A stream of gaseous feed mixture under relatively low superatmospheric pressure is introduced into the cycle by way of a conduit 8 and fed thereby to a scrubbing device 10 which functions to remove high boiling point impurities from the gaseous mixture. The scrubbed feed mixture is passed to a drier 11 to remove moisture therefrom, and from the drier the feed mixture is divided at point 12 with a major portion of the feed mixture being fed to conduit 13 and with a minor and remaining portion being conducted to a conduit 14. A control valve 15 is provided for establishing the proportions of the gaseous mixture fed to the conduits 13 and 14. The conduit 13 conducts the major portion of the feed mixture to a path 16 of a non-switching heat exchange zone presented by a heat exchange device 17 wherein the major portion of the feed mixture is cooled upon countercurrent heat exchange effecting relation with cold component gas of a fractionating operation described below, while the conduit 14 communicates with the inlet of a compressor 18 which functions to further increase the pressure of the minor portion of the gaseous mixture to a predetermined higher superatmospheric pressure discussed in detail below. The further compressed minor portion of the gaseous mixture is conducted by way of a conduit 19 to path 20 of a non-switching heat exchange zone presented by a heat exchange device 21 wherein the minor portion of the feed mixture is cooled upon countercurrent heat exchange effecting relation with cold component gas of the fractionating operation. The cool minor portion of gaseous mixture from the heat exchange device 21 is expanded in a valve 22 to the pressure of the major portion of the gaseous mixture. The cool major portion of the feed mixture is conducted from the heat exchange device 17 by a conduit 23 and is merged with the expanded minor portion of the feed mixture by a connection with a conduit 24, the total feed mixture being passed by the conduit 23 into the base of a high pressure section 25 of a two-stage fractionating column 26. The fractionating column also includes a low pressure section 27 separated from the high pressure section by a refluxing condenser 28 of conventional construction, and each of the sections is provided with liquid-vapor contact means such as fractionating trays 29. The gaseous mixture undergoes preliminary separation in the fractionating zone presented by the high pressure section 25 producing high boiling point liquid fraction collecting in a pool 30 in the base of the column and a gaseous low boiling point fraction which flows upwardly into the refluxing condenser and is liquefied upon heat exchange effecting relation with liquid product collecting in a pool 31 in the base of the low pressure section and surrounding the refluxing condenser. A portion of the liquefield low boiling point fraction flows downwardly into the high pressure section as reflux, and another portion collects in a pool 32 below the refluxing condenser from which a stream is withdrawn by way of a conduit 33, passed through an expansion valve 34 and introduced into the upper end of the low pressure section 27 as reflux. A stream of liquid high boiling point fraction is withdrawn from the pool 30 by way of conduit 35, expanded in a valve 36 and introduced as feed into the low pressure section by a conduit 37. In the fractionating zone presented by the low pressure section the separation is completed producing liquid high boiling point component collecting in the pool 31 and gaseous low boiling point component collecting in the dome of the column. Low boiling point component is withdrawn from the column 26 by a conduit 38 and conducted thereby to path 39 of the heat exchange device 17 wherein low boiling point component flows in countercurrent heat exchange effecting relation with the major portion of the gaseous feed mixture, low boiling point component being warmed upon flowing through the path 39 and leaves the heat exchange device 17 by way of a conduit 40 at substantially ambient temperature and atmospheric pressure. A conduit 42, provided with a flow control valve 43, is connected to the conduit 38 and conducts a stream of low pressure component through a path 44 of the heat exchange device 21 in countercurrent heat exchange effecting relation with the minor portion of the feed mixture, the low pressure component being warmed upon flowing through the path 44 and emerges from the warm end of the heat exchange device 21 by way of a conduit 45 at substantially ambient temperature and atmospheric pressure. Liquid high boiling point component is withdrawn from the pool 31 by way of a conduit 46 and conducted thereby to the suction inlet of a pump 47 which functions to increase the pressure of the liquid high boiling point component. Liquid high boiling point component under high pressure from the pump 47 is conducted by a conduit 48 to a path 49 of the heat exchange device 21 for countercurrent heat exchange effecting relation with the minor portion of the gaseous mixture flowing through the path 20. High pressure boiling point component is vaporized and warmed upon flowing through the path 49 and emerges from the path 49 at the warm end of the heat exchange device 21 through a conduit 50 at substantially ambient temperature and at a pressure determined by the pump 47.

As discussed above, in order to obtain economic heat exchange effecting relation between gaseous mixture and cold component gas in the heat exchange devices 17 and 21, it is necessary to maintain a small temperature difference between the gaseous mixture entering and the component gas leaving the warm ends of heat exchange devices. Due to the difference in the specific heat of the major portion of the gaseous mixture under a relatively low superatmospheric pressure and component gas at a pressure existing in the low pressure fractionating zone, which is slightly above atmospheric pressure, an optimum temperature difference between the fluids at the warm end of the heat exchange device 17 cannot be obtained when fluids of equal mass flow through the paths 16 and 39. The optimum temperature approach can be established, however, by passing a greater mass of low pressure component gas in heat exchange effecting relation with a lesser mass of gaseous mixture. For the same reasons, when equal masses of gaseous feed mixture and component gas under high pressure are passed in countercurrent heat exchange effecting relation, a wide temperature difference exists between the fluids at the warm end of the heat exchange zone and loss of cold results. This is so even when the gaseous mixture is compressed to a predetermined optimum pressure in accordance with the pressure of the component gas, that is, when the pressure of the gaseous mixture is such as to require a minimum quantity of gaseous mixture to warm to a predetermined temperature a given quantity of component gas at a given pressure. An efficient temperature difference may be obtained between high pressure component gas and high pressure gaseous mixture at the warm end of the heat exchange device 21 by passing a greater mass of high pressure gaseous mixture through the heat exchange device. However, the difference between the required mass of high pressure gaseous mixture and the mass of the component gas under high pressure is greater than the difference between the mass of the component gas under low pressure and the low pressure gaseous mixture and it is not possible to establish optimum temperature approaches at the warm ends of both of the heat exchange devices 17 and 21. In particular, if the mass of the fluids passed through the heat exchanger 17 are proportioned to obtain a close temperature approach, insufficient gaseous mixture will be available to warm up the high pressure component gas and, if the mass of the fluids in the heat exchanger 21 are properly proportioned, an excess of low pressure component gas will be present at the heat exchanger 17.

Since a greater mass of component gas under low pressure must be passed in heat exchange effecting relation with gaseous mixture under a higher pressure in order to obtain an optimum temperature approach at the warm end of the heat exchange zone, a still greater mass of component gas under low pressure will be required to establish an optimum temperature approach when the gaseous mixture is under a still higher pressure. Thus, the feature of the present invention of passing component gas under low pressure in countercurrent heat exchange effecting relation with high pressure feed mixture provides an excess of feed mixture which is used to warm up the high pressure component gas. By adjusting the mass of the low pressure component stream in the pass 44 it is possible to establish the mass relationship of the low pressure component gas and the major portion of the gaseous mixture in the heat exchange device 17, and to establish the mass relationship of the minor portion of the gaseous mixture and the component gas under high pressure and under low pressure in the heat exchange device 21, in such a manner as to maintain the component gas and the gaseous mixture in optimum temperature relationship at the warm ends of the heat exchange devices 17 and 21 and thus reduce loss of cold to a minimum. In addition, the stream of component gas under low pressure passed in countercurrent heat exchange effecting relation with the high pressure gaseous mixture produces a resulting temperature-enthalpy curve of the total component gas passed through the heat exchange device 21 which approaches parallel relationship with the temperature-enthalpy curve of the high pressure gaseous mixture and thereby improves the heat interchange efficiency and makes it possible to establish closer temperature differences at the ends of the heat exchange zone.

When the fractionating cycle shown in FIGURE 1 is employed to separate atmospheric air, the air feed which may enter the cycle under a pressure of 85 p.s.i.a. is passed through the scrubber 10 and the drier 11 to remove carbon dioxide and moisture therefrom. A major portion of the air feed, free of carbon dioxide and moisture, is passed in heat exchange effecting relation with cold nitrogen component gas in the heat exchange device 17, the cold nitrogen component being delivered from the fractionating column at about 20 p.s.i.a., and the major portion of the air feed leaves the cold end of the heat exchange device 17 at a temperature slightly above its saturation temperature at the existing pressure. The minor portion of the dried and purified air feed is passed to the compressor 18 where its pressure is increased to about 3000 p.s.i.a., and the highly compressed air feed is conducted to the heat exchange device 21 for countercurrent heat interchange with cold product gas including the total oxygen recovered under a pressure of 450 p.s.i.a. as determined by the pump 47. The cooled high pressure air from the heat exchange device 21 is is expanded in the valve 22 to 85 p.s.i.a. and fed with the major portion of the air feed to the fractionating column 26 for separation into oxygen and nitrogen components in a conventional manner. While the total oxygen recovered is compressed to a pressure of 450 p.s.i.a., the minor portion of the air feed is delivered from the compressor at a pressure of about 3000 p.s.i.a. to provide the necessary make-up refrigeration for the cycle upon expansion in the valve 22. In order to establish a close temperature approach, about 5° to 10° F., at the warm end of the heat exchange device 17 it is necessary to pass about 1.025 moles of low pressure nitrogen component gas through the heat exchange device for each mole of low pressure air, and a close temperature approach of about 5° to 10° F. may be established at the warm end of the heat exchange device 21 upon passing about 1.45 moles of high pressure air in heat interchange with each mole of high pressure oxygen component. Assuming that atmospheric air comprises 80% nitrogen component and 20% oxygen component, it will be necessary to pass about 78% of the air feed in heat exchange effecting relation with the total nitrogen component to establish a small temperature difference between the temperatures of the fluids at the warm end of the heat exchange device 17. Thus about 22% of the air feed would be available for heat interchange with the high pressure oxygen component, whereas under the conditions set forth about 29% of the air feed is required to warm the oxygen component to the desired temperature. Since about 1.6 moles of nitrogen component at 20 p.s.i.a. is required to be passed in heat exchange effecting relation with one mole of air at 3000 p.s.i.a. for efficient heat interchange, it is possible to obtain close temperature approach at the warm ends of each of the heat exchange devices by passing a portion of the low pressure nitrogen component, of the proper mass, through the path 44 of the heat exchange device 21. In the foregoing example, the low pressure nitrogen stream flowing through the path 44 comprises about 19.5% of the air feed. About 59% of the air feed under a pressure of 85 p.s.i.a. flows through the heat exchange device 17 in heat interchange with the remaining nitrogen component and about 41% of the air feed is compressed to about 3000 p.s.i.a. and conducted through the path 20 of the heat exchange device 21 in countercurrent heat exchange effecting relation with the stream of low pressure nitrogen component and with the high pressure oxygen component comprising 20% of the air feed.

Figure 2:
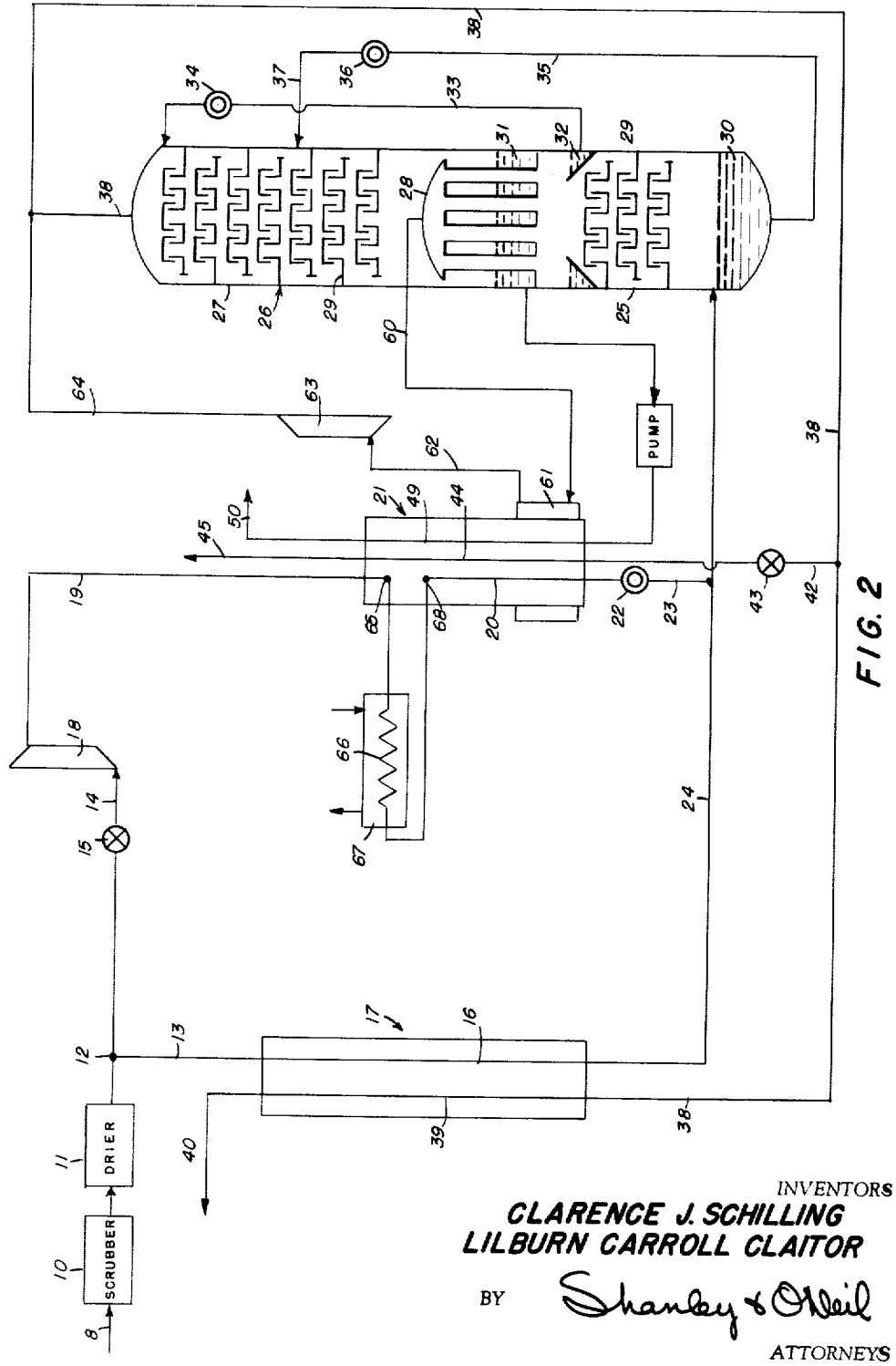
FIGURE 2 is a diagrammatic showing of a fractionating cycle of the type shown in FIGURE 1 illustrating the manner in which additional refrigeration may be obtained.

In the cycle shown in FIGURE 1 refrigeration is obtained only upon expansion of the high pressure portion of the feed mixture in the valve 22. When substantial refrigeration is required, as assumed in the foregoing example, it becomes necessary to increase the mass of the high pressure portion of the feed mixture and/or to compress the minor portion of the feed mixture to a pressure greater than the optimum pressure for efficient heat interchange with pumped component gas. In order to reduce power requirements refrigeration may be obtained in cycles embodying the principles of the present invention by expanding a high pressure fluid of the cycle and/or from an external source as illustrated in FIGURE 2, which is otherwise similar to the cycle shown in FIGURE 1. With reference to FIGURE 2, a stream of gaseous low boiling point fraction may be withdrawn from the dome of the refluxing condenser 28 by way of a conduit 60 and conducted thereby to a heat exchange passageway 61 located in heat exchange effecting relation with the cold end of the heat exchange device 21. The low boiling point fraction is warmed upon flowing through the passageway 61, and the warm stream is fed through conduit 62 to an expansion engine 63 wherein the stream is expanded with production of work to the pressure of the low pressure section of the fractionating column, the stream being warmed in the heat exchange passageway 61 to a temperature such that liquid will not form in the expansion engine. The cold effluent from the expansion engine is merged with the low boiling component from the fractionating column through a conduit 64. In another arrangement high pressure gaseous mixture may be withdrawn at point 65 from the path 20 of the heat exchange device 21, cooled upon passing through a coil 66 in heat exchange with a boiling liquid refrigerant in a vessel 67, and then returned to the path 20 at point 68. It is to be understood of course that the stream of high pressure gaseous mixture may be withdrawn at any point along the path 20 at which the stream is at the proper temperature for heat interchange with the external source of refrigeration.

While the feature of obtaining additional refrigeration in the manner shown in FIGURE 2 requires an increase in the mass of the high pressure feed mixture to establish a close temperature approach with the pumped component at the warm end of the heat exchange device 21, a material saving of power is achieved since the pressure and quantity of the major portion of the feed mixture is substantially less than that required to obtain the total refrigeration upon only expanding the minor portion of the feed mixture in the valve 22. In particular, with reference to the foregoing example of the cycle shown in FIGURE 1, and assuming the same refrigeration requirements are present, by the use of an external source of refrigeration and/or by expanding a stream of high boiling fraction withdrawn from the refluxing condenser, it is possible to obtain the required refrigeration by merely compressing about 32% of the air feed to an optimum pressure of about 1500 p.s.i.a. for efficient heat interchange with oxygen component at 450 p.s.i.a.

As mentioned above, the feature provided by the present invention of passing low pressure component in heat exchange effecting relation with the minor portion of the feed mixture makes it possible to employ unbalanced switching heat exchange zones for effecting heat interchange between the major portion of the feed mixture and low pressure component and thereby remove high boiling point impurity from the major portion of the feed mixture. This arrangement is incorporated in the cycle shown in FIGURE 3 of the drawings. In this cycle, gaseous feed mixture compressed to a relatively low superatmospheric pressure enters the cycle through conduit 100 and is divided at point 101 with a major portion of the feed mixture being conducted through conduit 102 and a minor portion being conducted through conduit 103, the relative proportions of the major and minor portions being determined by feed control valve 104. The major portion of the feed mixture is conducted in heat exchange effecting relation with cold component gas under low pressure from a fractionating operation described below in switching heat exchange zones which may comprise switching regenerators 105, 106 and 107, 108. The regenerators 105 and 106 are connected at their warm ends to feed mixture inlet manifold 109 provided with switching valves 110, 110 and to component gas outlet manifold 111 provided with switching valves 112, 112, and at their cold ends to feed mixture outlet manifold 113 having switching valves 114, 114 and to component gas inlet manifold 115 including switching valves 116, 116. The regenerators 107 and 108 are provided at their warm and cold ends with similar feed mixture inlet and outlet manifolds 118 and 119, respectively, each having switching valves 120, 120 and 121, 121, respectively, and with corresponding component gas inlet and outlet manifolds 122 and 123, respectively, having switching valves 124, 124 and 125, 125, respectively. The major portion of the feed mixture is conducted to the air inlet manifolds 109 and 118 through conduits 126 and 127, respectively, and the feed mixture outlet manifolds 113 and 119 are connected by way of conduits 128 and 129 to a conduit 130. The minor portion of the feed mixture is conducted by the conduit 103 to a compressor 135 and thereby compressed to a relatively high superatmospheric pressure. The high pressure feed mixture is passed to a scrubber 136, wherein high boiling point impurity is removed, and then through a drier 137. Dry high pressure feed mixture is conducted by a conduit 138 through path 139 of a heat exchange device 140. From the path 139, the minor portion of the feed mixture is expanded in valve 141 and thereafter merged by way of conduit 142 with the major portion of the feed mixture in the conduit 130. The major and minor portions of the feed mixture are cooled upon flowing through the switching regenerators 105—106 and 107—108 and the heat exchanger 139, in heat exchange relation with cold component gas of the feed mixture as described below, and the total feed mixture is conducted by the conduit 130 into the high pressure section 25 of the two-stage fractionating column 26 which may be similar to the fractionating column shown in FIGURE 1.

A stream of liquid high boiling component is withdrawn from the pool 31 of the fractionating column by way of a conduit 145 and is conducted to the inlet of a pump 146 designed for pumping low boiling point liquids. The pump 146 operates to increase the pressure of the liquid low boiling component to a predetermined relatively high pressure, and the low boiling component under high pressure is passed by conduit 147 to a path 148 of the heat exchange device 140. The low boiling component under relatively high pressure is vaporized and warmed upon flowing through the path 148 in countercurrent heat exchange effecting relation with the minor portion of the feed mixture, and leaves the cycle through condition 149 at substantially ambient temperature and at a pressure determined by the pump 146. A flow control valve 150 may be located on the suction side of the pump to control the quantity of liquid high boiling component withdrawn from the fractionating column. High boiling component in gaseous phase is withdrawn from the fractionating column by way of a conduit 151 and conducted thereby to the low pressure component gas inlet manifold 122 associated with the regenerators 107 and 108. The high boiling component is warmed upon flowing through the regenerators 107 and 108 in heat exchange effecting relation with a portion of the feed mixture under low superatmospheric pressure, and leaves the cycle at substantially atmospheric pressure and ambient temperature by way of a conduit 152 connected to the low boiling component outlet manifold 123. A conduit 153 communicates with the conduit 151 and conducts gaseous high boiling component, under low pressure, to a path 154 of the heat exchange device 140, the gaseous high boiling component is warmed upon flowing through the path 154 in countercurrent heat exchange effecting relation with the high pressure feed mixture and leaves the cycle by way of conduit 155 at substantially atmospheric pressure and at ambient temperature. A flow control valve 156 is located in the conduit 151 to determine the quantity of high boiling component withdrawn from the fractionating column, and a flow control valve 157 is located in the conduit 153 and a flow control valve 158 is located in the conduit 151 downstream of the conduit 153 to determine the quantity of high boiling component fed to the path 154 of the heat exchange device 140 and to the low pressure component inlet manifold 122, respectively. Low boiling component is withdrawn from the fractionating column through a conduit 160 and conducted thereby to the low pressure inlet manifold 115 connected to the regenerators 105 and 106, low boiling component being warmed upon flowing through the regenerators 105 and 106 in countercurrent heat exchange effecting relation with feed mixture under low superatmospheric pressure and leaves the cycle at substantially atmospheric pressure and ambient temperature through conduit 161 connected to the component gas outlet manifold 111. A conduit 162, connected to the conduit 160, conducts low boiling component through a path 163 of the heat exchange device 140 in countercurrent heat exchange relation with high pressure feed mixture, the warmed high boiling component leaving the cycle by way of a conduit 164. A flow control valve 165 is positioned in the conduit 162, and a flow control valve 166 is located in the conduit 160 downstream of the conduit 162, to determine the quantity of low boiling component fed to the path 163 of the heat exchange device 140 and to the low pressure component inlet manifold 115, respectively.

Figure 3:
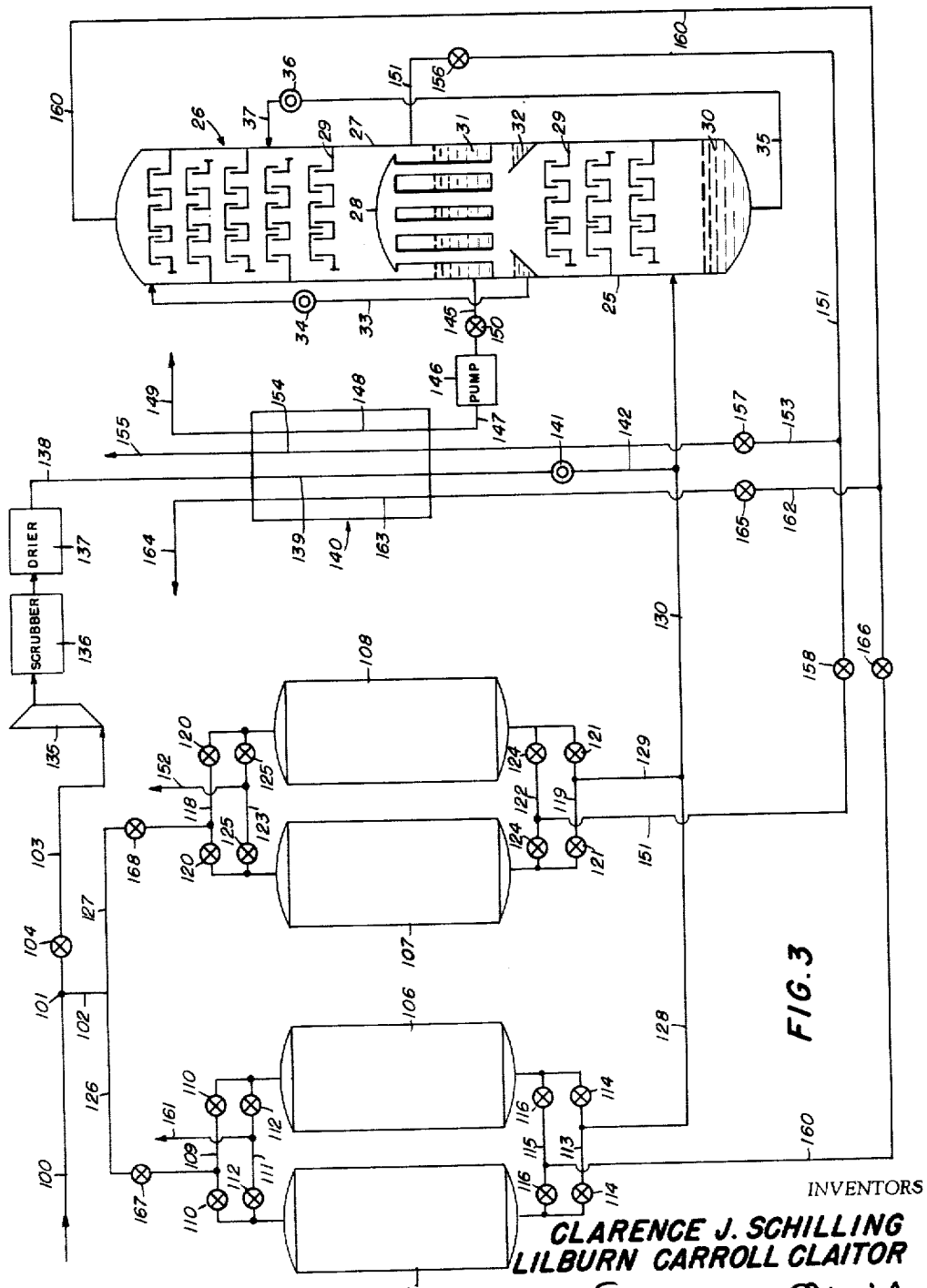
FIGURE 3 is a diagrammatic illustration of a fractionating cycle constructed in accordance with another embodiment of the present invention.

In operation of the cycle shown in FIGURE 3, gaseous feed mixture under a low superatmospheric pressure, such as atmospheric air under a pressure of 85 p.s.i.a. enters the cycle through the conduit 100 with a major portion being passed in countercurrent heat exchange effecting relation with cold component gas in the switching regenerators 105, 106 and 107, 108. The major portion of the air feed is divided between conduits 126 and 127 in accordance with the mass of nitrogen and oxygen components flowing through the regenerators 105, 106 and 107, 108, respectively, and in order to establish a close temperature approach of about 5° to 10° F. between the air and the cold component at the cold ends of the regenerators to insure complete removal from the regenerators of high boiling point impurities, i.e., moisture and carbon dioxide, precipitated from the major portion of the air feed and deposited in the regenerators, an excess of cold component gas is passed through the regenerators at a ratio of about 1.056 moles of cold component gas per mole of air. The remaining minor portion of the air feed is compressed to about 3000 p.s.i.a. to provide refrigeration required for the cycle upon subsequent expansion in the valve 141, and is passed through the scrubber 136 and the drier 137 to remove carbon dioxide and moisture therefrom. The clean and dry high pressure air is then passed through heat exchange device 140 in countercurrent heat exchange effecting relation with cold component including pumped oxygen which may comprise 15% of the air feed. The cooled high pressure air from the heat exchange device 140 is expanded in the valve 141 to about 85 p.s.i.a. and is merged with the major portion of the air feed and the total air feed at a temperature slightly above saturation temperature at the existing pressure is fed to the fractionating column 26 and separated into oxygen and nitrogen component gas in a conventional manner, it being assumed that the oxygen component comprises 20% and the nitrogen component comprises 80% of the air feed. The remaining oxygen component comprising 5% of the air feed is withdrawn from the column in gaseous phase under low pressure and passed in countercurrent heat exchange effecting relation with the air feed, a part flowing through the path 154 of the heat exchange device 140 and a part flowing through the regenerators 107, 108. The total nitrogen component is withdrawn from the low pressure section 27 by conduit 160 with one portion being conducted to path 163 of the heat exchange device 140 for countercurrent heat interchange with high pressure air feed and with the remaining portion being passed through the regenerators 105, 106 in countercurrent heat exchange effecting relation with a proportional part of the major portion of the air feed under low pressure. Under the foregoing conditions, in order to maintain close temperature approaches of 5° to 10° F. at the cold ends of the regenerators 105, 106 and 107, 108, and at the warm end of the heat exchange device 140 according to the present invention, a stream of low pressure component gas comprising about 7% of the feed mixture is passed in countercurrent heat interchange with about 26% of the total air feed under a pressure of about 3000 p.s.i.a. The major portion or about 74% of the air feed under low superatmospheric pressure pases in heat interchange with low pressure component gas comprising about 78% of the total air feed. The low pressure component gas passed in countercurrent heat exchange effecting relation with the high pressure air may comprise oxygen component and nitrogen component in any desired proportion to provide a low pressure component gas stream comprising about 7% of the total air feed. In particular, 1% of the oxygen component under low pressure may be passed through path 154 in heat interchange with high pressure air and 4% conducted to the regenerators 107 and 108 for heat interchange with low pressure air, while 6% of the nitrogen component may be passed through path 163 in heat interchange with high pressure air, to provide a total low pressure component comprising 7% of the air feed, with the remaining 72% of the nitrogen component flowing through the regenerators 105, 106. The cycle may be operated with a single stream of low pressure component flowing through a path of the heat exchange device 140, and the single stream may comprise either a stream of low boiling component or a stream of higher boiling component providing the requirement with respect to mass is met. In particular, valve 165 may be closed to direct the total low boiling component to the rengerators 105 and 106 and the quantity of high boiling component under low pressure conducted through the path 154 may be established to maintain close temperature approach at the cold ends of the regenerators and at the warm end of the heat exchange device 140. Also, the cycle may be operated with the valves 158 and 165 closed to pass the total gaseous high boiling point component through the path 154 of the heat exchange device 140 and to direct the total feed mixture under relatively low superatmospheric pressure through the regenerators 105 and 106 in heat exchange effecting relation with the total low boiling component withdrawn from the column by way of the conduit 160. In addition, the cycle may be operated with valve 157 closed and valves 158, 166 and 165 open to conduct the total gaseous high boiling component through regenerators 107, 108, to pass a portion of the low boiling component, of the proper mass, through path 163 of the heat exchange device 140 and to pass the remainder of the low boiling component to the regenerators 105, 106.

Whether the low pressure stream of component gas passed in countercurrent heat interchange with the high pressure portion of the feed mixture comprises one component of the feed mixture or a composite stream including at least two components of the feed mixture, and irrespective of the proportions of the different components of the composite stream, the major portion of the feed mixture is divided and passed to the regenerators 105, 106 and 107, 108 in proportion with the mass of the cold component gas fed to respective regenerators in a predetermined ratio, such as 1.056 moles of low pressure nitrogen or oxygen component to one mole of air in the case of air feed under 85 p.s.i.a., to establish a temperature difference of the fluids at the cold ends of the regenerators within 5° to 10° F. and thereby insure that component gas flowing through the regenerators sweeps out high boiling point impurities deposited therein. Thus with this cycle high boiling point impurities are removed from the major portion of the feed mixture in the switching heat exchange zones and it is only necessary to provide scrubbing and drying equipment of a capacity required for removing high boiling point impurities from the minor portion of the feed mixture. This cycle also illustrates the manner in which the present invention may be practiced to obtain as product more than one low pressure component uncontaminated with high boiling point impurities.

Figure 4:
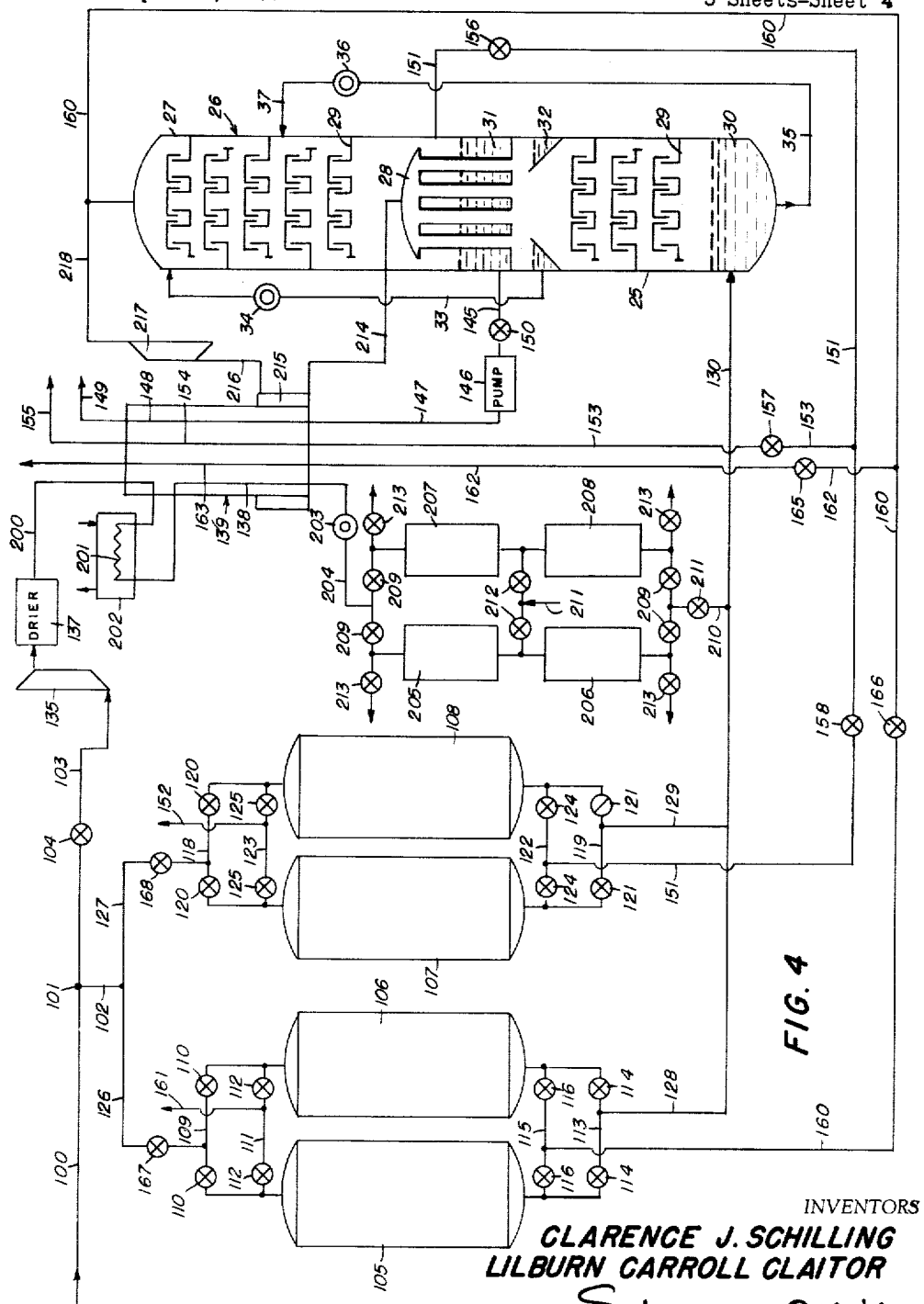
FIGURE 4 is a diagrammatic illustration of a modification of the fractionating cycle shown in FIGURE 3.

The embodiment of the invention shown in FIGURE 4 of the drawings comprises a fractionating cycle incorporating the features shown in FIGURE 3 and including arrangements for obtaining additional refrigeration and an alternate system for moving high boiling point impurity from the minor portion of the feed mixture. As shown, the minor portion of the feed mixture under relatively high superatmospheric pressure delivered from the compressor 135 is passed through the drier 137 and then conducted by a conduit 200 to path 139 of the heat exchange device 140. The stream of high pressure feed mixture is withdrawn from the path 139 and cooled upon passing through a coil 201 in heat exchange effecting relation with a source of liquid refrigerant contained in vessel 202. The cooled high pressure feed mixture is returned to the heat exchange device 140 and is further cooled upon flowing through the remaining portion of the path 139 in heat exchange effecting relation with cold component of the feed mixture. From the cold end of the path 139, the high pressure feed mixture is expanded in a valve 203 to a pressure corresponding to the pressure existing in the high pressure section 25 of the fractionating column or to a higher intermediate pressure, and the expanded feed mixture is conducted by way of conduit 204 for flow through serially connected filter 205 and adsorber 206, or serially connected filter 207 and adsorber 208 alternately upon operation of switching valves 209. From the adsorbers 206 or 208, the minor portion of the feed mixture is merged, by way of conduit 210, with the major portion of the feed mixture in the conduit 130. An expansion valve 211 may be included in the conduit 210 to reduce the pressure of the minor portion of the feed mixture to correspond to the pressure existing in the high pressure section 25. In accordance with the invention disclosed and claimed in copending application Serial No. 576,963, filed April 9, 1956 of Clarence J. Schilling and Cyde McKinley for "Method and Apparatus for Separating Gaseous Mixtures Including High Boiling Point Impurities," now Patent No. 2,968,160, the feed mixture from the compressor 135 is above a critical pressure such that high boiling point impurity included in the feed mixture does not precipitate and collect in the path 139 of the heat exchange device 140. However, upon expansion of the feed mixture to below the critical pressure in valve 203, high boiling point impurity precipitates and is substantially completely removed from the feed mixture in filters 205 or 207. The adsorbers 206 and 208 function to remove precipitated impurity that may pass through the filters and also to remove high boiling point impurity dissolved in the feed mixture, and feed mixture substantially free of high boiling point impurity is delivered to the conduit 210. The filter-adsorber combinations may be purged when off-stream by feeding a warm stream of product gas from conduit 211, past an open control valve 212, through the filter and adsorber that is switched off-stream and through open control valves 213 associated therewith.

In the cycle shown in FIGURE 4, additional refrigeration may be obtained by expanding a stream of low boiling point fraction withdrawn from the dome of the refluxing condenser 28. As shown, a stream of low boiling point fraction is withdrawn through conduit 214 and conducted to passageway 215 located in heat exchange relation with the cold end of the heat exchange device 140. The stream is warmed upon flowing through the passageway 215 and is withdrawn therefrom by conduit 216 and fed to an expansion engine 217 wherein the stream is expanded with work to the pressure existing in the low pressure stage 27 and is then merged by way of conduit 218 with low boiling point component gas withdrawn from the low pressure section of the fractionating column.

The mass of the low pressure component gas flowing through the heat exchange device 140 in countercurrent heat interchange with the high pressure feed mixture is proportioned in a manner previously described to maintain the fluids at the cold ends of the regenerators and at the warm end of the heat exchange device 140 within a predetermined temperature range. The low pressure component gas may comprise separate components of the gaseous feed mixture or two or more components. As discussed previously in connection with the cycle shown in FIGURE 2, the feature of providing refrigeration by an arrangement in addition to expansion of the high pressure feed mixture through a valve makes it possible to decrease the mass and pressure of the minor portion of the feed mixture with respect to what would otherwise be required to provide adequate refrigeration, with a concomitant decrease in the mass of the low pressure component in heat interchange therewith. Thus when one component only is passed in heat interchange with the high pressure feed mixture a greater proportion of the one component may be delivered under high pressure.

Figure 5:
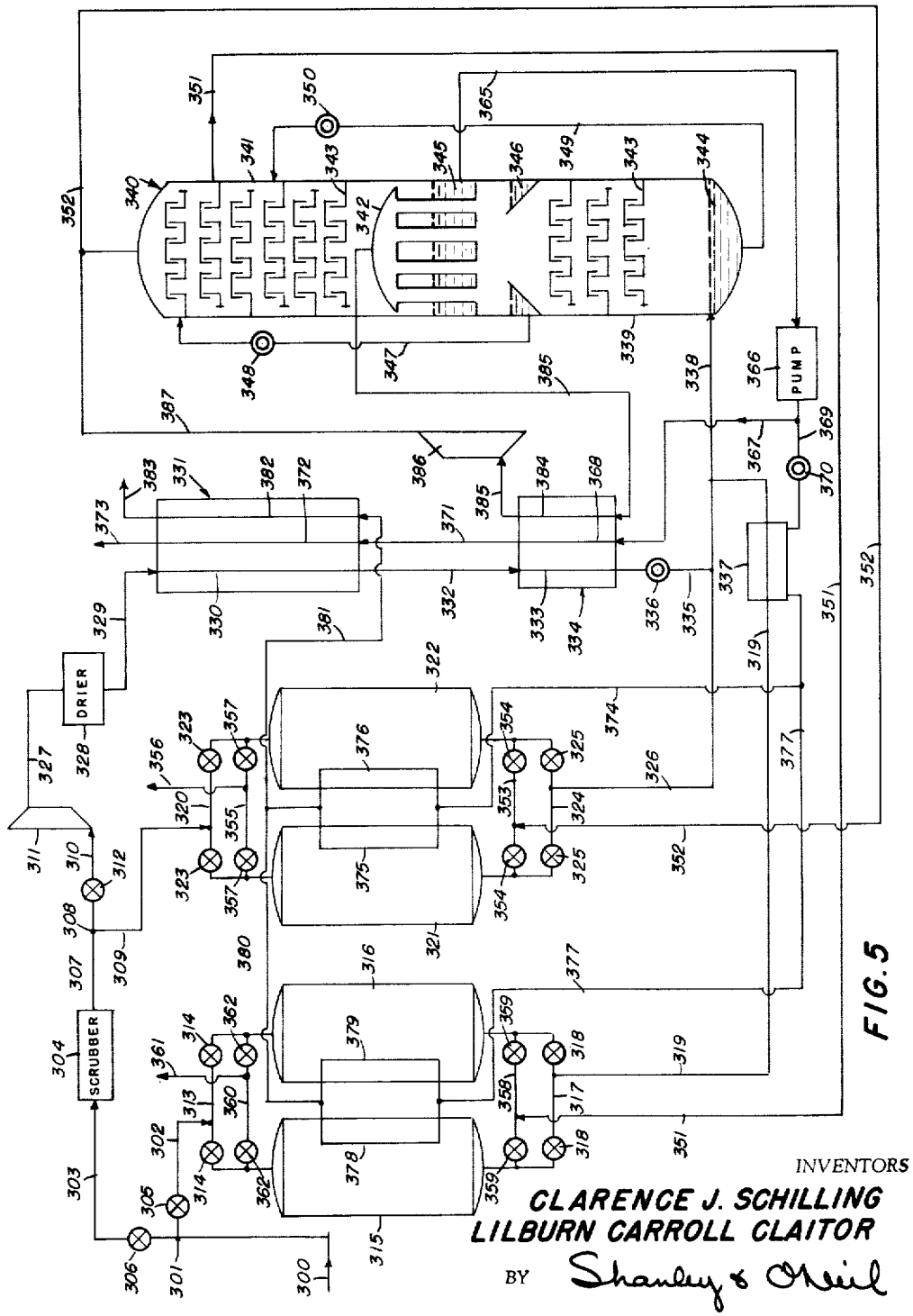
FIGURE 5 is a diagrammatic presentation of a fractionating cycle constructed in accordance with a still further embodiment of the present invention.

In FIGURE 5 of the drawings, a fractionating cycle embodying the principles of the present invention is disclosed for producing one component of gaseous feed mixture under high pressure and under an intermediate pressure, relative to the pressure of the low pressure stage of the fractionating zone, free of high boiling point impurities fed to the cycle with the gaseous feed mixture. As shown, gaseous feed mixture compressed to a relatively low superatmospheric pressure enters the cycle through conduit 300 and is divided at point 301 with a first part being fed through conduit 302 and with the remainder being conducted through conduit 303 to a scrubbing device 304 wherein high boiling point impurities are removed, flow control valves 305 and 306 are provided for determining the proportion of the feed mixture in the conduits 302 and 303. Scrubbed feed mixture is conducted by conduit 307 to point 308 where a second part of the feed mixture is divided and passed to conduit 309, the remaining or third part of the feed mixture being conducted by conduit 310 to a compressor 311. A flow control valve 312 is provided to determine the proportions of the second and third parts of the feed mixture. The first part of the feed mixture in the conduit 302 is passed to feed mixture inlet manifold 313, having switching valves 314, 314, and being connected to the warm ends of regenerators 315 and 316. A feed mixture outlet manifold 317, having switching valves 318, 318, is connected to the other ends of the regenerators 315 and 316 and to a cold feed mixture outlet conduit 319. The second part of the gaseous feed mixture is passed by the conduit 309 to a feed mixture inlet manifold 320 connected to the warm ends of regenerators 321 and 322, the manifold 320 including switching valves 323, 323. A feed mixture outlet manifold 324, having switching valves 325, 325, is connected to the other ends of the regenerators 321 and 322 and to a cold feed mixture outlet conduit 326. The first and second parts of the feed mixture are cooled upon flowing alternately through the regenerators 315, 316 and 321, 322, respectively, in countercurrent heat exchange effecting relation with cold component of the feed mixture as will be described more fully below. The third part of the gaseous feed mixture compressed in the compressor 311 to a predetermined relatively high superatmospheric pressure is fed by conduit 327 to a drier 328, and dried high pressure feed mixture is conducted by way of conduit 329 to pass 330 of a heat exchange device 331 wherein high pressure feed mixture passes in countercurrent heat exchange effecting relation with cold component of the feed mixture in a manner that will be described more fully below. Cooled high pressure feed mixture from the path 330 is conducted by conduit 332 to pass 333 of a heat exchange device 334 wherein the high pressure feed mixture passes in countercurrent heat exchange effecting relation with colder component of the feed mixture, as described below, and is then passed to a conduit 335 including a valve 336 for expanding the high pressure feed mixture to a pressure corresponding to the relatively low superatmospheric pressure of the first and second parts of the feed mixture. The conduit 319 conducts the first part of the feed mixture to a heat exchange device 337 for heat interchange with a colder fluid as described below. The further cooled first part of the feed mixture is then merged with the second and third parts of the feed mixture in conduit 338 and the total feed mixture is fed by the conduit 338 to a high pressure section 339 of a fractionating column 340 including a low pressure section 341 and a refluxing condenser 342, the fractionating zones presented by the sections 339 and 340 being provided with liquid-vapor contact means such as fractionating plates 343. Preliminary separation of the feed mixture takes place in the high pressure section producing liquid high boiling point fraction, collecting in a pool 344 in the base of the column and a gaseous low boiling point fraction which flows into the refluxing condenser 342 and is liquefied by heat interchange with liquid high boiling point component collecting in a pool 345 in the base of the low pressure section. A portion of the liquefied low boiling point fraction enters the low pressure section as reflux and another portion collects in a pool 346 below the refluxing condenser from which a stream is withdrawn by conduit 347, expanded in valve 348 and introduced into the top of the low pressure section as reflux. Liquid high boiling point fraction is withdrawn from the pool 344 by a conduit 349, expanded in a valve 350 and introduced into the low pressure section as feed. The separation is completed in the low pressure section producing liquid high boiling component collecting in the pool 345 and gaseous low boiling point component which flows upwardly and collects in the dome of the fractionating column. In order to obtain low boiling point component of high purity, a gaseous stream of low boiling component of low purity is withdrawn from a point of the low pressure section below the uppermost fractionating plate through a conduit 351.

Low boiling component of high purity is withdrawn from the low pressure section by a conduit 352 and is conducted thereby to a cold component gas inlet manifold 353 connected to the cold ends of the regenerators 321 and 322, the manifold 353 including switching valves 354, 354. A component gas outlet manifold 355 is connected to the warm ends of the regenerators 321 and 322 and to a component gas outlet conduit 356, the manifold 355 also including switching valves such as valves 357, 357. Upon operation of the switching valves of the inlet and outlet manifolds associated with the regenerators 321 and 322, low boiling component of high purity alternately flows through the regenerators 321 and 322 in countercurrent heat exchange effecting relation with the second part of the feed mixture to cool the feed mixture in the manner described above. Low boiling component of high purity leaves the cycle through the conduit 356 at substantially atmospheric pressure and ambient temperature. The stream of low boiling component of low purity withdrawn from the low pressure section by the conduit 351 is conducted thereby to a cold component inlet manifold 358, having switching valves 359, 359, connected to the cold ends of the regenerators 315 and 316. A component gas outlet manifold 360 is connected to the other ends of the regenerators 315 and 316 and to a component gas outlet conduit 361, the manifold 360 being provided with switching valves 362, 362. Upon operation of the switching valves of the inlet and outlet manifolds connected to the regenerators 315 and 316, the low boiling component of low purity alternately flows through the regenerators 315 and 316 in countercurrent heat exchange effecting relation with the first part of the feed mixture to cool the feed mixture in a manner described above. Warmed low boiling component of low purity leaves the cycle through the conduit 361 at substantially atmospheric pressure and ambient temperature.

The total high boiling point component of the feed mixture is withdrawn from the pool 345 in liquid phase and is conducted by conduit 365 to the inlet of a pump 366. High boiling component delivered from the pump under a predetermined relatively high pressure is divided with one portion being conducted by a conduit 367 to path 368 of the heat exchange device 334 and with another portion flowing through a conduit 369 to an expansion valve 370. The portion of the high pressure high boiling component in the path 368 is vaporized in countercurrent heat exchange effecting relation with the third part of the feed mixture as described above, and is then passed by conduit 371 to a path 372 of the heat exchange device 331 for further countercurrent heat exchange effecting relation with the third part of the feed mixture. High boiling component in gaseous phase and under relatively high pressure determined by the pump 366 leaves the path 372 through a conduit 373 at substantially ambient temperature. The other portion of the liquid high boiling component under high pressure is expanded in the valve 370 to a lower pressure above the pressure existing in the low pressure section of the fractionating column, and is vaporized in the heat exchange device 337 wherein the high boiling component under intermediate pressure is in heat exchange effecting relation with the first part of the feed mixture. The intermediate pressure high boiling component is then divided with one portion being passed by a conduit 374 through parallel connected heat exchange paths 375 and 376, respectively positioned in the regenerators 321 and 322, and with the other portion being passed by conduit 377 to parallel connected heat exchange paths 378 and 379 positioned in the regenerators 315 and 316, respectively. The heat exchange paths 375, 376, 378 and 379 terminate below the warm ends of respective regenerators and are connected to a common manifold 380 which communicates through conduit 381 to path 382 of the heat exchange device 331. High boiling component at the intermediate pressure is warmed to below ambient temperature upon flowing through the heat exchange paths 375, 376, 378 and 379, and is further warmed to substantially ambient temperature upon flowing through the path 382 in countercurrent heat exchange effecting relation with the third part of the feed mixture under relatively high pressure, the low boiling component at intermediate pressure being withdrawn from the cycle through a conduit 383.

Refrigeration may be obtained by withdrawing a stream of gaseous low boiling point fraction from the dome of the refluxing condenser 342 and conducting the withdrawn stream by a conduit 385 to a path 384 of the heat exchange device 334 wherein the stream flows in countercurrent heat exchange effecting relation with the third part of the feed mixture under high pressure. The low boiling point fraction is warmed upon flowing through the path 384 and is then conducted by conduit 385 to an expansion engine 386 wherein the low boiling point fraction is expanded with work to the pressure of the low pressure section of the fractionating column. The effluent of the expansion engine passes through a conduit 387 and is merged with low boiling component of high purity withdrawn from the low pressure section of the fractionating column.

In operation of this cycle gaseous feed mixture under a relatively low superatmospheric pressure, such as atmospheric air under a pressure of 87 p.s.i.a., enters the cycle through the conduit 300 and is divided at point 301 with the first part comprising about 46% of the air feed flowing through conduit 302 to the regenerators 315 and 316 and with the remainder flowing through conduit 303 to the scrubber 304. Air feed from the scrubber free of high boiling point impurity is divided at point 308 with a second part comprising about 35% of the total air feed flowing through conduit 309 to the regenerators 321 and 322 and with a third part, the remaining 19% of the air feed, being compressed in the compressor 311 to about 1500 p.s.i.a. The high pressure air is then passed through the drier 328 and the exchange device 331 and is cooled in heat interchange with the total oxygen component comprising about 20% of the air feed and enters the conduit 332 at about −38° F., 13% of the oxygen component being under a pressure of 485 p.s.i.a. and 7% being expanded by valve 370 to about 28 p.s.i.a. The high pressure air then flows through path 333 of the heat exchange device 334 in heat interchange with the high pressure oxygen component in liquid phase and is cooled to about −268° F. The low pressure air fed to the regenerators 315 and 316 is cooled upon heat interchange with low purity nitrogen component and a portion of the oxygen product under intermediate pressure, and the scrubbed low pressure air is cooled upon flowing through the regenerators 321 and 322 in heat interchange with high purity nitrogen component and a portion of the oxygen component at the intermediate pressure. Air from the regenerators cooled to about −278° F. is merged with the high pressure portion of the air feed, after its expansion to about 87 p.s.i.a., and the total air feed is introduced into the fractionating column at a temperature slightly above its saturation temperature at the existing pressure. In the fractionating column the air feed is separated in a conventional manner into oxygen and nitrogen components.

The first part of the air feed flows through the regenerators 315 and 316 in countercurrent heat interchange with cold component of the air feed in predetermined mass relation to establish a temperature difference of about 5° to 10° F. between the fluids entering and leaving the regenerators at their cold ends and thereby insure substantially complete removal of high boiling point impurities precipitated for the air and deposited in the regenerators, the ratio being about 1.056 moles of low pressure component gas to one mole of air at 87 p.s.i.a. The low pressure component gas for establishing the proper temperature approach at the cold ends of the heat exchangers 315 and 316 comprises the total low purity nitrogen withdrawn from the column by way of the conduit 351 and a portion of the oxygen component under the intermediate pressure. Since 46% of the air feed flows through the regenerators 315 and 316 in order to obtain the proper temperature approach it is necessary to pass through the regenerators low pressure component gas comprising about 49.2% of the feed mixture. The impure nitrogen component withdrawn from the column comprises about 46.5% of the feed mixture and the proper mass relationship is effectively achieved by the portion of oxygen product at the intermediate pressure flowing through the heat exchange paths 378 and 379. The second part of the air feed comprising about 35% of the feed mixture that is passed through the regenerators 321 and 322 is free of carbon dioxide and since it is only necessary to remove moisture therefrom the mass relationship of the fluids flowing through these regenerators is proportioned to establish an optimum temperature difference of about 5° to 10° F. between the fluids at the warm ends of the regenerators, a ratio of about 1.025 moles of low pressure component gas to one mole of air being adequate for this purpose and low pressure component gas comprising about 36% of the total feed is required. High purity nitrogen component, comprising about 35% of the air feed, is passed to the regenerators 321 and 322 and the deficiency of cold component gas is effectively provided by a portion of the oxygen component at the intermediate pressure flowing through the heat exchange paths 375 and 376.

According to the principles of the present invention described above, in a cycle in which 19% of the air feed under 1500 p.s.i.a. is passed in heat interchange with 13% of the oxygen component under 485 p.s.i.a., it is possible to obtain optimum temperature approach for the heat interchange between low pressure air and low pressure component and for heat interchange between high pressure air and high pressure component by passing a stream of low pressure component comprising about 3% to 4% of the feed mixture in countercurrent heat interchange with the high pressure air. Thus if 7% of the oxygen component from the expansion valve 370, the oxygen component from the expansion valve 370, being at a temperature of about −295° F., was passed in countercurrent heat interchange with the high pressure air, it would be necessary to compress an additional quantity of air to 1500 p.s.i.a. In order to overcome this power loss while at the same time producing a stream of oxygen component under 28 p.s.i.a. and comprising 7% of the feed mixture, which is passed in heat interchange with the high pressure air to balance the cycle, 7% of the oxygen component is warmed to a critical temperature by heat interchange with low pressure air before being passed in heat interchange with the high pressure air. The stream of oxygen component at the intermediate pressure is warmed in the heat exchange paths 375, 376, 378 and 379 to about −60° F. and introduced at that temperature into path 382 at the cold end of the heat exchange device 331.

The cycle shown in FIGURE 5 illustrates that the stream of component gas passed in heat interchange with the high pressure feed mixture for the purpose of achieving optimum temperature approach for the feed mixture heat interchange zones may be at a pressure above the low pressure existing in the fractionating zone and may comprise a percentage of the feed mixture greater than the minimum percentage required for achieving the optimum temperature approach without increasing the power consumption of the cycle.

As mentioned above, although the various embodiments of the invention have been described in the environment of separating atmospheric air into oxygen and nitrogen component gas, it is to be expressly understood that the principles of the present invention may be employed in cycles designed for the separation of other gaseous mixtures including gaseous mixtures having two or more components, for example in the separation of natural gas. Also, while in each of the embodiments of the invention high boiling component is delivered under relatively high pressure, it is contemplated to employ the novel features provided by the present invention in cycles for delivering low boiling point component in gaseous phase under relatively high pressure as well as in cycles designed to deliver streams of components of different boiling points in gaseous phase under relatively high pressure. For example, with reference to FIGURE 1 of the drawings, by employing a fractionating column designed to produce nitrogen component in liquid phase, liquid nitrogen component may be withdrawn from the column, compressed while in liquid phase to a relatively high predetermined pressure and then vaporized and warmed to substantial ambient temperature in heat interchange with a portion of the air feed under a predetermined relatively high pressure. The stream of low pressure component also in heat interchange with the high pressure air may comprise low pressure gaseous nitrogen component, low pressure gaseous oxygen component or low pressure oxygen and low pressure nitrogen component. It will be appreciated that in this type of cycle the total or a portion of the oxygen component may be also pumped while in liquid phase to a relatively high predetermined pressure and simultaneously passed in countercurrent heat interchange with the high pressure portion of the feed mixture.

In some cycles embodying the principles of the present invention, such as when substantial quantities of two or more components are withdrawn from the cycle under relatively high pressure, the major portion of the gaseous feed mixture may be compressed to a relatively high pressure. In addition, in the separation of certain gaseous mixtures a third component under relatively low pressure may be employed for the required heat interchange with the high pressure feed mixture. For example, in the separation of atmospheric air into oxygen, nitrogen and argon component gas, nitrogen component under low pressure may be passed in heat interchange with a major portion of the air feed, oxygen component may be compressed to a relatively high pressure and passed in heat interchange with the minor portion of the air feed under relatively high pressure and argon component may comprise the stream of low pressure component gas passed in heat interchange with the high pressure air feed.

Methods according to the present invention effect separation of gaseous mixtures into fractions of the gaseous mixture and such separated fractions comprise "a gaseous phase part including one component of the gaseous mixture" and "a liquid phase part including another component of the gaseous mixture." In operation of the cycle of FIGURE 1 when separating air the gaseous phase part of the separated fractions consists of the nitrogen gas withdrawn from the fractionating column while in operation of the cycle shown in FIGURES 3, 4 and 5 the gaseous phase part of the separated fractions includes oxygen and nitrogen components of the gaseous mixture. Also, as described above, in operation of all of the cycles disclosed herein the liquid phase part of the separated fractions may include oxygen and nitrogen components. Thus, the term "a gaseous phase part including one component of the gaseous mixture" as used in the appended claims, covers methods in which the gaseous phase part of the separated fractions comprises one component or more than one component of the gaseous mixture and the term "a liquid phase part including another component of the gaseous mixture," as used in the appended claims comprises one component or more than one component of the gaseous mixture.

Although several embodiments of the invention have been disclosed and described herein, it is to be expressly understood that various changes and substitutions may be made therein without departing from the spirit of the invention as well understood by those skilled in the art. Reference therefore will be had to the appended claims for a definition of the limits of the invention.

What is claimed is:

1. Method of separating gaseous mixtures in a fractionating operation, in which operation compressed and cooled gaseous mixture is separated into fractions of the gaseous mixture, the separated fractions of the gaseous mixture comprising a gaseous phase part including one component of the gaseous mixture and a liquid phase part including another component of the gaseous mixture, comprising the steps of providing a major portion of compressed gaseous mixture, passing the major portion of compressed gaseous mixture in heat interchange with cold fluid including a first portion of the gaseous phase part of the separated fractions under relatively low pressure to cool the major portion of the compressed gaseous mixture and to warm the first portion of the gaseous phase part of the separated fractions, the relative masses of the major portion of compressed gaseous mixture and of the cold fluid being so proportioned that the heat interchange therebetween warms the first portion of the gaseous phase part of the separated fractions to about 5° F.–10° F. of the temperature to the major portion of compressed gaseous mixture, providing a minor portion of compressed gaseous mixture under a high pressure relative to the major portion of compressed gaseous mixture, compressing liquid phase part of the separated fractions to provide compressed liquid phase part, passing the minor portion of compressed gaseous mixture in heat interchange with a second portion of the gaseous phase part of the separated fractions under relatively low pressure and in heat interchange with compressed liquid phase part to cool the minor portion of compressed gaseous mixture and to warm the second portion of the gaseous phase part of the separated fractions and to vaporize the compressed liquid phase part, the mass of the minor portion of compressed gaseous mixture being proportioned relative to the mass of the second portion of the gaseous phase part of the separated fractions and compressed liquid phase part in heat interchange therewith so that the heat interchange therebetween warms the second portion of the gaseous phase part of the separated fractions and compressed liquid phase part to about 5° F.–10° F. of the temperature of the minor portion of compressed gaseous mixture, expanding the minor portion of compressed gaseous mixture, and passing expanded minor portion of the gaseous mixture and cooled major portion of compressed gaseous mixture to the fractionating operation.

2. Method of separating gaseous mixtures as defined in claim 1 in which the gaseous phase part of the separated fractions consists substantially of one component of the gaseous mixture and in which the liquid phase part of the separated fractions consists substantially of another component of the gaseous mixture.

3. Method of separating gaseous mixtures as defined in claim 1 in which the gaseous mixture comprises air, in which the gaseous phase part of the separated fractions comprises nitrogen, and in which the liquid phase part of the separated fractions comprises oxygen.

4. Method of separating gaseous mixtures as defined in claim 1 in which the minor portion of the compressed gaseous mixture is passed in heat interchange with a boiling refrigerant and then passed in the heat interchange with the second portion of the gaseous phase part of the separated fractions under relatively low pressure and in heat interchange with compressed liquid phase part.

5. Method of separating gaseous mixtures as defined in claim 1 in which cold gas from the fractionating operation is passed in heat interchange with the minor portion of compressed gaseous mixture, is expanded with production of external work and the effluent of the work expansion is employed to provide refrigeration for the operation.

6. Method of separating gaseous mixtures as defined in claim 4 in which cold gas from the fractionating operation is passed in heat interchange with the minor portion of compressed gaseous mixture, is expanded with production of external work and the effluent of the work expansion is employed to provide refrigeration for the operation.

7. Method of separating gaseous mixtures as defined in claim 1 in which the first portion of the gaseous phase part of the separated fractions includes more than one component of the gaseous mixture.

8. Method of separating gaseous mixtures as defined in claim 7 in which the second portion of the gaseous phase part of the separated fractions includes more than one component of the gaseous mixture.

9. Method of separating gaseous mixtures as defined in claim 1 in which the second portion of the gaseous phase part of the separated fractions is passed in heat interchange with the major portion of compressed gaseous mixture before being passed in heat interchange with the minor portion of compressed gaseous mixture.

10. Method of separating gaseous mixtures as defined in claim 9 in which the second portion of the gaseous phase part of the separated fractions comprises vaporized liquid component of the gaseous mixture.

11. Method of separating gaseous mixtures as defined in claim 1 in which the minor portion of compressed gaseous mixture is passed in one direction through one path of a heat exchange zone and the second portion of the gaseous phase part of the separated fractions and the compressed liquid phase part are passed in the opposite direction through separate paths of the heat exchange zone to cool the minor portion of compressed gaseous mixture and to warm the second portion of the gaseous phase part of the separated fractions and to vaporize the compressed liquid phase part.

12. Method of separating gaseous mixtures as defined in claim 11 in which the minor portion of compressed gaseous mixture is passed in heat interchange with a boiling refrigerant, and then flowed through the one path of the heat exchange zone.

13. Method of separating gaseous mixtures as defined in claim 11 in which compressed fluid is withdrawn from the heat exchange zone at a temperature level suitable for subsequent expansion with work, the withdrawn fluid is expanded with work, and effluent of the work expansion is employed to provide refrigeration for the operation.

14. Method of separating gaseous mixtures as defined in claim 1 in which gaseous mixture comprising the major portion and the minor portion of compressed gaseous mixture is purified to remove high boiling point impurities before the major portion and the minor portion of gaseous mixture are passed in heat interchange with separated fractions of the gaseous mixture.

15. Method of separating gaseous mixtures in a fractionating operation,
in which operation compressed and cooled gaseous mixture is separated into fractions of the gaseous mixture,
the separated fractions of the gaseous mixture comprising a gaseous phase part including one component of the gaseous mixture and a liquid phase part including another component of the gaseous mixture,
comprising the steps of providing a major portion of compressed gaseous mixture,
flowing the major portion of compressed gaseous mixture in one direction through a first path and flowing a cold fluid including a first portion of the gaseous phase part of the separated fractions under relatively low pressure in the oposite direction in heat exchange effecting relation with the first path during one period of the heat interchange to cool the major portion of compressed gaseous mixture and congeal high boiling point impurity along the first path,
flowing the first portion of the gaseous phase part of the separated fractions through the first path in the opposite direction in contact with the congealed impurity during a second period of the heat interchange, proportioning the relative mass of the cold fluid and the major portion of compressed gaseous mixture so that the first portion of the gaseous phase part of the separated fractions flowing through the first path substantially completely sweeps out congealed impurity during the second period of the heat interchange,
providing a minor portion of compressed gaseous mixture under high pressure relative to the major portion,
compressing liquid phase part of the separated fractions to provide compressed liquid phase part,
passing the minor portion of compressed gaseous mixture in heat exchange effecting relation with a second portion of the gaseous phase part of the separated fractions under relatively low pressure and in heat exchange effecting relation with compressed liquid phase part to cool the minor portion of compressed gaseous mixture and to warm the second portion of the gaseous phase part of the separated fractions and to vaporize the compressed liquid phase part,
expanding the cool minor portion of compressed gaseous mixture,
passing expanded minor portion of compressed gaseous mixture and cool major portion of compressed gaseous mixture to the fractionating operation,
and removing high boiling point impurity from the minor portion of compressed gaseous mixture before expanded minor portion of compressed gaseous mixture is passed to the fractionating operation.

16. Method of separating gaseous mixtures as defined in claim 15 in which the mass of the minor portion of compressed gaseous mixture is proportioned relative to the mass of the second portion of the gaseous phase part of the separated fractions and the compressed liquid phase part so that the heat interchange therebetween warms the second portion of the gaseous phase part of the separated fractions and the compressed liquid phase part to about 5° F.–10° F. of the temperature of the minor portion of compressed gaseous mixture.

17. Method of separating gaseous mixtures as defined in claim 16 in which the minor portion of compressed gaseous mixture is cooled upon flowing through a heat exchange zone and in which high boiling point impurity is removed from the minor portion of compressed gaseous mixture without the heat exchange zone.

18. Method of separating gaseous mixtures as defined in claim 17 in which high boiling point impurity is removed from the minor portion of compressed gaseous mixture by a scrubbing operation.

19. Method of separating gaseous mixtures as defined in claim 17 in which cool minor portion of compressed gaseous mixture is flowed through an absorber to remove high boiling point impurity therefrom.

20. Method of separating gaseous mixtures as defined in claim 17 in which the minor portion of compressed gaseous mixture flows through one path of the heat exchange zone and in which the second portion of the gaseous phase part of the separated fractions and the compressed liquid phase part flow through separate paths of the heat exchange zone in countercurrent relation with the minor portion of compressed gaseous mixture.

21. Method of separating gaseous mixtures as defined in claim 16 in which the minor portion of the compressed gaseous mixture is passed in heat interchange with a boiling refrigerant and then passed to the heat interchange with the second portion of the gaseous phase part of the separated fractions and the compressed liquid phase part.

22. Method of separating gaseous mixtures as defined in claim 17 in which compressed fluid is withdrawn from the heat exchange zone at a temperature level suitable for subsequent expansion with work, the withdrawn fluid is expanded with work, and effluent of the work expansion is employed to provide refrigeration for the operation.

23. Method of separating gaseous mixtures as defined in claim 22 in which the minor portion of compressed gaseous mixture is passed in heat interchange with a boiling refrigerant and then passed to the heat exchange zone for flow through the one path.

24. Method of separating gaseous mixtures as defined in claim 23 in which cold minor portion of compressed gaseous mixture is flowed through an adsorber to remove high boiling point impurity therefrom.

25. Method of separating gaseous mixtures as defined in claim 16 in which the first portion of the gaseous phase part of the separated fractions includes more than one component of the gaseous mixture.

26. Method of separating gaseous mixtures as defined in claim 16 in which the second portion of the gaseous phase part of the separated fractions includes more than one component of the gaseous mixture.

27. Method of separating gaseous mixtures as defined in claim 25 in which the second portion of the gaseous phase part of the separated fractions includes more than one component of the gaseous mixture.

28. Method of separating gaseous mixtures as defined in claim 16 in which the second portion of the gaseous phase part of the separated fractions is passed in heat interchange with the major portion of compressed gaseous mixture before being passed in heat interchange with minor portion of compressed gaseous mixture.

29. Method of separating gaseous mixtures in a fractionating operation,
   in which operation compressed and cooled gaseous mixture undergoes preliminary separation in a first fractionating zone under relatively high pressure producing fractions including gaseous low boiling point fraction and liquid high boiling point fraction and in which the separation is continued in a second fractionating zone under relatively low pressure producing separated fractions of the gaseous mixture,
   the separated fractions of the gaseous mixture comprising a gaseous phase part including one component of the gaseous mixture and a liquid phase part including another component of the gaseous mixture,
   comprising the steps of providing a major portion of compressed gaseous mixture,
   flowing the major portion of compressed gaseous mixture in one direction through a first path and flowing a cold fluid including a first portion of the gaseous phase part of the separated fractions in the opposite direction in heat exchange effecting relation with the first path during one period of the heat interchange to cool the major portion of compressed gaseous mixture and congeal high boiling point impurity along the first path,
   flowing the first portion of the gaseous phase part of the separated fractions through the first path in the opposite direction in contact with the congealed impurity during a second period of the heat interchange,
   proportioning the relative mass of the cold fluid and the major portion of compressed gaseous mixture so that the first portion of the gaseous phase part of the separated fractions flowing through the first path substantially completely sweeps out congealed impurity during the second period of the heat interchange,
   providing a minor portion of compressed gaseous mixture under high pressure relative to the major portion,
   compressing liquid phase part of the separated fractions to provide compressed liquid phase part,
   passing the minor portion of compressed gaseous mixture in heat exchange effecting relation with a second portion of the gaseous phase part of the separated fractions and in heat exchange effecting relation with compressed liquid phase part to cool the minor portion of gaseous mixture and to warm the second portion of the gaseous phase part of the separated fractions and to vaporize compressed liquid phase part,
   withdrawing a gaseous fraction from the first fractionating zone,
   passing the withdrawn fraction in heat interchange with the minor portion of compressed gaseous mixture and then expanding the gaseous fraction to provide refrigeration for the operation,
   expanding the cool minor portion of compressed gaseous mixture,
   passing expanded minor portion of compressed gaseous mixture and cool major portion of compressed gaseous mixture to the first fractionating zone,
   and removing high boiling point impurity from the minor portion of compressed gaseous mixture before the minor portion of gaseous mixture is passed to the first fractionating zone.

30. Method of separating gaseous mixtures in a fractionating operation,
   in which operation compressed and cooled gaseous mixture is separated into fractions of the gaseous mixture,
   the separated fractions of the gaseous mixture comprising a gaseous phase part including one component of the gaseous mixture and a liquid phase part including another component of the gaseous mixture,
   comprising the steps of providing a major portion of compressed gaseous mixture,
   passing the major portion of compressed gaseous mixture in heat interchange with cold fluid including a first portion of the gaseous phase part of the separated fractions to cool the major portion of compressed gaseous mixture and to warm the first portion of the gaseous part of the separated fractions,
   providing a minor portion of compressed gaseous mixture under a high pressure relative to the major portion of compressed gaseous mixture,
   compressing liquid phase part of the separated fractions to provide compressed liquid phase part,
   passing the minor portion of compressed gaseous mixture in heat interchange with a second portion of the gaseous phase part of the separated fractions and in heat interchange with compressed liquid phase part to cool the minor portion of compressed gaseous mixture and to warm the second portion of the gaseous phase part of the separated fractions and to vaporize the compressed liquid phase part,
   the mass of the gaseous mixture being proportioned between the major portion of compressed gaseous mixture and the minor portion of compressed gaseous mixture and the mass of the gaseous phase part of the separated fractions being proportioned between the first portion and the second portion of the gaseous part of the separated fractions relative to the mass of the major and minor portions of compressed gaseous mixture and in accordance with the mass of the compressed liquid phase part so that the first portion of the gaseous phase part of the separated fractions, the second portion of the gaseous phase part of the separated fractions and the compressed liquid phase part are warmed to about 5° F.–10° F. of the temperature of that portion of the compressed gaseous mixture in heat interchange therewith,
   expanding the minor portion of compressed gaseous mixture,
   and passing expanded minor portion of compressed gaseous mixture and cooled major portion of compressed gaseous mixture to the fractionating operation.

31. Method of separating gaseous mixtures in a fractionating operation,
   in which operation compressed and cooled gaseous mixture is separated into fractions of the gaseous mixture,
   the separated fractions of the gaseous mixture comprising a gaseous phase part including one component of the gaseous mixture and a liquid phase part including another component of the gaseous mixture, comprising the steps of providing a major portion of compressed gaseous mixture, passing the major portion of compressed gaseous mixture in switching heat interchange with a cold fluid including a first portion of the gaseous phase part of the separated fractions, the major portion of compressed gaseous mixture being flowed in one direction through a first path and the cold fluid in the opposite direction in heat exchange with the first path during one period of the heat interchange to cool the major portion of compressed gaseous mixture and congeal high boiling point impurity along the first path and the first portion of the gaseous phase part of the separated fractions being flowed through the first path in the opposite direction during the second period of heat interchange, providing a minor portion of compressed gaseous mixture under a high pressure relative to the major portion of compressed gaseous mixture, compressing liquid phase part of the separated fractions to provide compressed liquid phase part, passing the minor portion of compressed gaseous mixture in heat interchange with a second portion of the gaseous phase part of the separated fractions and with compressed liquid phase part to cool the minor portion of compressed gaseous mixture and to warm the second portion of the gaseous phase part of the separated fractions and to vaporize the compressed liquid phase part, the mass of the gaseous mixture being proportioned between the major portion of compressed gaseous mixture and the minor portion of compressed gaseous mixture and the mass of the gaseous phase part of the separated fractions being proportioned between the first portion of the gaseous phase part and second portion of the gaseous phase part of the separated fractions relative to the mass of the major portion and the minor portion of compressed gaseous mixture and in accordance with the mass of the compressed liquid phase part so that the first portion of the gaseous phase part of the separated fractions substantially completely sweeps out congealed impurity from the first path during the second period of the heat interchange, and so that the second portion of the gaseous phase part of the separated fractions and the compressed liquid phase part are warmed to about 5° F.–10° F. of the temperature of the second portion of compressed gaseous mixture interchange therewith, expanding the minor portion of compressed gaseous mixture, passing expanded minor portion of compressed gaseous mixture and cooled major portion of compressed gaseous mixture to the fractionating operation, and removing high boiling point impurity from the minor portion of compressed gaseous mixture before the minor portion of compressed gaseous mixture is passed to the fractionating operation.

References Cited in the file of this patent

UNITED STATES PATENTS

| | | |
|---|---|---|
| Re. 19,267 | Van Nuys | Aug. 7, 1934 |
| 1,945,634 | Frankl | Feb. 6, 1934 |
| 2,002,940 | Frankl | May 28, 1935 |
| 2,514,391 | Haynes | July 11, 1950 |
| 2,673,456 | Scharmann | Mar. 30, 1954 |
| 2,699,047 | Karwat | Jan. 11, 1955 |
| 2,708,831 | Wilkinson | May 24, 1955 |
| 2,712,738 | Wucherer et al. | July 12, 1955 |
| 2,918,802 | Grunberg | Dec. 29, 1959 |

FOREIGN PATENTS

| | | |
|---|---|---|
| 952,908 | Germany | Nov. 28, 1956 |

UNITED STATES PATENT OFFICE
CERTIFICATE OF CORRECTION

Patent No. 3,086,371

April 23, 1963

Clarence J. Schilling et al.

It is hereby certified that error appears in the above numbered patent requiring correction and that the said Letters Patent should read as corrected below.

Column 22, line 48, for "absorber" read -- adsorber --; column 26, line 14, strike out "interchange therewith".

Signed and sealed this 3rd day of December 1963.

(SEAL)
Attest:
ERNEST W. SWIDER

Attesting Officer

EDWIN L. REYNOLDS

Acting Commissioner of Patents